United States Patent [19]

Kirschbaum

[11] 4,075,071

[45] Feb. 21, 1978

[54] METHOD FOR THE TREATMENT OF ESSENTIAL OILS AND WOOD PARTICLES CONTAINING ESSENTIAL OILS

[76] Inventor: Robert N. Kirschbaum, 1706 Edison St., Brush, Colo. 80723

[21] Appl. No.: 807,257

[22] Filed: June 16, 1977

[51] Int. Cl.$^2$ .............................................. C25B 3/00
[52] U.S. Cl. ................................. 204/136; 204/72; 204/131; 204/132
[58] Field of Search .................. 204/136, 132, 72, 131

[56] References Cited

U.S. PATENT DOCUMENTS

| | | | |
|---|---|---|---|
| 336,622 | 2/1886 | Coffin | 204/131 |
| 695,573 | 3/1902 | Magnier et al. | 204/132 |
| 1,005,354 | 10/1911 | Strong | 204/132 |
| 1,377,021 | 5/1921 | Mumford | 204/136 |
| 1,780,750 | 11/1930 | Horn | 204/132 |
| 2,828,253 | 3/1958 | Kurz | 204/132 |

*Primary Examiner*—R. L. Andrews
*Attorney, Agent, or Firm*—Van Valkenburgh and Lowe

[57] ABSTRACT

A process for the treatment of essential oils per se and wood containing essential oils to convert a substantial portion of the oils to wood sugars and to change the structure of wood to render the same susceptible to bacterial action. It is to be noted that the essential oils are inhibitors of bacterial growth and as such they prevent wood from being digestible by bacteria. The process consists essentially in blending the essential oils or immersing wood particles containing essential oils into an electrolyte solution which may be formed by common salts such as NaCl. Passing an electrical current through the solution, using a metal anode which is eaten away during the process, converts the oils to wood sugars and also changes the wood structure in such a manner as to render the same susceptible to digestion by bacteria such as Rumen flora and Termite flora.

17 Claims, No Drawings

METHOD FOR THE TREATMENT OF ESSENTIAL OILS AND WOOD PARTICLES CONTAINING ESSENTIAL OILS

Reference is made to Disclosure Document filed June 16, 1975 extending Disclosure Document filed Apr. 1, 1974, No. 030327.

The present invention relates to the treatment of the essential oils found in woody plants, and more particularly to a process for changing essential oils into digestible wood sugars.

An important object of the invention is to provide a novel method to so treat essential oils as they are disposed in woody plants and at the same time, disrupt the cellular structure of wood fibers of the plants in a manner which will render the wood fibers edible and digestible by microorganisms for subsequent use, as for a protein or energy source.

Wood is known to be indigestible except by creatures such as termites and is considered as having no food value insofar as livestock is concerned. Many woods, especially soft woods, also have significant amounts of essential oils which are inhibitors to bacterial growth and further prevent the formation of bacterial colonies such as Rumen flora which could be processed into livestock feed. Nevertheless, the wood fiber contains substantial food value in that it consists of approximately 75 percent cellulose. The cellulose, repeating glucose units with a Beta linkage, is digestible. However, the wood fiber includes approximately 12 percent lignin which combines with and binds the cellulose to render the wood fiber indigestible. As hereinafter set forth, the treatment of soft woods by a process which converts the essential oils within them into sugars, surprisingly enough, also breaks down or alters in some manner the cellulose-lignin bond to render the wood capable of sustaining bacterial growths such as Rumen flora.

It follows that another object of the invention is to provide a novel, simple process for treating soft woods, such as pine, which have significant amounts of essential oils in their makeup, in a manner which changes the essential oils and the structure of the soft wood components.

Another object of the invention is to provide a novel and improved method for treating the excess sawdust and wood chips, which are the by-products of sawmills, to render the same digestible by microorganisms, to produce useful product, and to thereby find a profitable use for a waste product which at present creates a continuous disposal problem.

Another object of the invention is to provide a novel and improved method for treating the normal waste occurring when soft wood trees are logged and milled which thus permits the entire plant to be profitably used by rendering the chips, sawdust and even the leaves and branches of a tree digestible by microorganisms such as Rumen flora and/or termite flora.

Other objects of the invention are to provide a novel and improved method for treating waste softwood particles to render the same digestible by microorganisms which is a simple, low cost, easily controlled operation using common, easily obtained reagents.

The essential oils with which the present invention is concerned, which are classed as terpines, are found in soft woods such as fir, pine and juniper. While essential oils are also found in brush-type plants such as sagebrush, their presence appears to be negligible in hardwoods, such as oak or maple, and woods of the latter type appear to be unsuitable for use in the present invention.

Such oils may be obtained by distillation, by heating the wood and/or leaves of a suitable plant to temperatures ranging from approximately 60° C. and to a temperature as high as approximately 230° C. For example, a few of the essential oils found in Western Juniper (Juniperis scopulorum), include: Tricyclene, $\alpha$-Pinene, $\alpha$-Thujene, Camphene, $\beta$-Pinene, Sabinene, $\beta$-Carene, Myrcene, $\alpha$-Terpinene, Limonene, $\beta$-Phellandrene, and $\gamma$-Terpinene. In all, approximately 40 such essential oils are found in the plant. Additional information concerning the same may be found in the doctoral thesis by Dr. Robert P. Adams, entitled Studies of Natural Population of Junipers, available at the University of Texas, Austin, Tex., 1969. These oils are obtained and separated by fractional distillation processes. Each plant will have some oils unique to it, and also the same oils will be found in a number of different species of plants. The essential oils found in each plant are similar, fairly stable, aromatic, light-colored oils. They are also soluble in water to some extent. For the purpose at hand, it appears that most and possibly all of these oils respond in the same manner to the process constituting the present invention, regardless of their individual characteristics and thus, the disclosure hereinafter set forth, will refer to essential oils present in soft woods and in some species of brush simply as "essential oils".

The essence of the present invention is to convert a substantial portion of the essential oils present in soft woods and some species of brush, into digestible sugars. This is accomplished by an electrolytic action in the presence of a metallic ion. The present invention is concerned with the direct conversion of essential oils into sugars and it is also concerned with the treatment of wood particles to convert the oils in the wood particles without extracting them from the wood. It was also discovered that whenever the process was applied to wood particles or leves wherein essential oils were present, the cellular structure of the fiber of the wood particles and leaves was altered to a form susceptible to digestion by bacterial action to create new products or an improved product. In this regard, it is to be noted that in some woods, such as pine, there is as much as three present essential oils, that pine needles and juniper woods have even more. However, insofar as the invention is concerned, it was found that lesser amounts of essential oils in these soft woods was sufficient and thus, the amounts were not critical.

One embodiment of the invention comprises the treatment of the oils extracted from plants to convert them to sugars. The extraction of essential oils from appropriate plants may be accomplished by distillation operations which need not be described herein. Also, as heretofore mentioned, the several essential oils which can be obtained in this manner can be treated as a group insofar as the process is concerned.

The oils are blended, dissolved or at least partially dissolved in an electrolyte solution which uses a salt to ionize the water to a degree sufficient to produce an electric current through the solution. Any suitable container to hold the solution may be used. If the final product, the oils converted to sugars in the electrolyte, is to be used as animal food, as it may be, it becomes important that the ionizing salt be non-toxic and sufficiently dilute as to be tolerated by the animal. It was found that a small amount of salt, much less than that which could be tolerated by livestock was sufficient for this purpose. For example, only three grams of sodium chloride per liter of water could be used. It was also found that other salts, in addition to sodium chloride, could be used. For example, the sodium, potassium and calcium salts of chlorides, citrates, phosphates and carbonates are suitable. Also, salts such as magnesium sulphate can be used and it follows that the electrolyte may be a blend of selected salts.

The transformation of the oils to sugars is carried out by electrolysis of the electrolyte, using a metal electrode at the anode which will dissolve during the electrolysis operation. The action of this electrode is not fully understood, but apparently an oxidization-reduction reduction occurs. Several metals such as iron, copper, zinc and magnesium may be used as the electrode. An iron electrode is to be preferred because it is a low cost, non-toxic material.

The voltage across the electrodes may vary from 1½ to 105 volts D.C. and it appears that this voltage can be adjusted depending on the size of the container, the amount of salt in the electrolyte and the desired time required for the reaction. A suitable voltage and current can be established through simple tests with controls and observations to monitor the reaction. In operation, it was observed that the anode dissolved and that hydrogen gas was released at the cathode. It was also determined that reaction completion occurred when a change from a green color in the solution to a slightly brown color was observed, apparently an oxidation reaction of the iron. A more reliable indicaion was possible by measurement of the pH of the solution for this pH will increase from approximately 6.5 to 8 or 8.5 when the reaction is completed. The chemistry of the reaction is not fully understood and apparently, the metal of the anode reacts with the oils in an oxidation-reduction type of reaction. The types of sugar produced were analyzed and found to be cellulose and cellubiose. The latter can be determined by infra-red spectrophotometry.

However, the best demonstration of a change in the oils, when the operation was completed, resides in implanting the solution with bacteria such as Rumen flora or termite flora and the resulting, observeable growth of bacteria demonstrated that the essential oils which are normally inhibitors of bacterial growth were so modified that they supported bacterial growth. Regardless of the actual chemical reactions which occurred, this result, changing the essential oils from bacterial growth inhibitors to growth supporters, is the result sought.

The following example illustrates this facet of the invention as actually carried out on a laboratory scale:

EXAMPLE I

Essential oils of Western Juniper were introduced into an aqueous electrolyte solution containing 0.85% NaCl in the proportion of 0.05ml of oil to 100ml of solution. Iron wire electrodes immersed in the solution were used for both the cathode and anode and a current was produced by applying a D.C. potential which varied in a sequence of four runs 1-½, 3, 4½ and 6 volts, respectively. The approximate reaction times varied from 12, 7, 4½ and 3 hours, respectively, terminating when there was an approximate change of pH from 6 to 8. The end products, checked by infrared spectrophotometry, were found to be cellulose and cellubiose. Possibly other plant sugars were also derived from the essential oils during the process. Quantitative measurements of the amount of sugar produced were not made; however, the solutions were inoculated with Rumen flora and the resulting growth of the flora demonstrated the change of the essential oils from bacterial growth inhibitors to growth mediums. This is the desired result.

EXAMPLE II

The same as Example I except copper wire was used as electrodes instead of iron. The results were essentially the same.

Another embodiment of the invention, and more important from the commercial viewpoint, is the treatment of wood particles containing essential oils. As heretofore stated, the preferred woods are soft woods or conifers, such as pine, fir and juniper. These various soft woods are available as lumbermill by-products such as sawdust, chips and the like. Larger wood pieces or particles of wood may be pulverized in a hammermill since oversized pieces or particles of wood are not especially effective. For example, chips of wood, as large as ¾ inches in length by ⅛ inch thick, can be used, but these chips will require a longer time for treatment. Preferably the wood particles should be of a fineness at least equal to sawdust and even to a fineness which approaches wood flour, such as that which will pass through a 20 mesh screen. Where leaves such as pine needles are used, no special preparation was found to be necessary, although the leaves may be crushed before treatment. Where a shrub containing essential oils, such as sagebrush, is used, the branches and leaves are to be ground to relatively small particles.

An electrolyte solution is prepared in a suitable container by adding a small amount of salt to water, the same as heretofore described. The wood particles are then added to this solution. Volumetrically, the water must exceed the wood content several times, because during the electrolytic operation, considerable swelling of the wood will occur.

It is contemplated that when the operation is completed, several uses for the final product are possible, for example, the wood and also the electrolyte solution may be used by feeding it directly to livestock. For such a use, the amount of salt to be used to produce an electrolyte solution must be small and, as mentioned, must not exceed that which can be tolerated by the livestock. The salt, if sodium chloride, may vary from 8½ grams per liter to three grams per liter. It may be desirable to use equivalent amounts of other types of salts or a blend of salts to provide the necessary minerals required by the livestock which are now fed to livestock in other various ways. Such minerals will include potassium salts and small amounts of other salts, as well as the trace minerals so necessary to a proper animal growth.

As heretofore mentioned, an iron electrode is preferable for use as an anode to provide current through the electrolyte and when the wood particles are immersed in the electrolyte. The operation can commence by passing a current through the solution as heretofore described. Observation of the solution shows first a light green color to the solution and green specks on the sawduct particles. As the operation nears completion, the iron will begin to oxidize to a brown color. Also, as heretofore mentioned, the best mode of determining the progress of the reaction is to measure the change of pH which will start at about 6.5 and the electrical current stop between 8 and 8.5. A significant change resides in the fact that the wood particles will swell to about three times their original size. This reaction was unexpected and it is believed the same occurs because of a breakdown of the chemical bonding between the lignin and the cellulose which permits the cellulose of the wood to be liberated. Why this reaaction occurs while the essential oils are converted to sugars is not fully understood.

EXAMPLE III

One gram of sawdust was immersed in 100 ml of water having 0.85% NaCl. Iron electrodes were immersed in the solution and a potential, 1.5 volts, was imposed on the solution for 20 hours. The observed current was 0.04 amperes. The iron electrodes colored the solution green, but after 20 hours the green color began to turn brown and a pH reading of 8.5 was noted. The sawdust expanded considerably, to approximately three times its original size. Determinations of cellulose content by a digestion procedure indicated a significant increase in cellulose content especially when compared with an identical control solution where no electrical voltages and currents were used.

EXAMPLE IV

A blend the same as Example III was used but the voltage was increased to 6 volts and a current of 0.1 amp was noted. The reaction time was 10 hours and the results were essentially the same as noted in Example II. The increase of cellulose content and the change of sawdust bulk was essentially the same as previously noted.

EXAMPLE V

A blend the same as Example III using a 0.3% NaCl solution, but otherwise the same as Example II, was treated at a potential of 6 volts across the electrodes. The current was 0.05 amps and the reaction time was approximately 23 hours. The increase of cellulose content and the change of sawdust bulk was essentially the same as previously noted.

EXAMPLE VI

A blend using a 2.0% NaCl solution, but otherwise the same as Example III was treated at a potential of 6 volts across the electrodes at a current of 0.14 amps and the reaction time was decreased to approximately 7 hours. The increase of cellulose content and the change of sawdust bulk was essentially the same as previously noted.

EXAMPLE VII

The same as Example III except that a blend of salts were used; namely: 1.169 g/l NaCl (0.1169%) 0.840 g/l NaH Co$_3$; 2,943 g/l Na$_3$C$_6$H$_5$O$_7$.2H$_2$O; 0.690 g/l NaH$_2$PO$_4$ . H$_2$O; 0.745 g/l KCL; and 0.111 g/l CaCl$_2$. The blend was treated at a potential of 1.5 volts across the electrodes at a current of 0.05 amps for approximately 12 hours. The increase of cellulose content and the change of sawdust bulk was essentially the same as previously observed.

EXAMPLE VIII

The product of Example III was inoculated with Termite flora. After approximately 12 hours, the slime of Termite flora could be observed.

EXAMPLE IX

The product of Example III was inoculated with Rumen flora. After approximately 4 hours a lactic acid odor could be detected.

After the transformation of the wood particles in the solution is complete, the product may be inoculated with bacteria. The bacteria, such as Termite flora and Rumen flora will grow in the solution at a rapid rate. The essential oils are no longer capable of inhibiting their growth and the cellulose component of the wood fibers will provide additional nourishment for producing protein.

I have now described my invention in considerable detail. However, it is obvious that others skilled in the art can arrange and device alternate and equivalent construction and operations which are nevertheless within the spirit and scope of my invention. Hence, I desire that my protection be limited, not by the constructions and operations illustrated and described, but only by the proper scope of the appended claims.

What is claimed is:

1. The method for the treatment of an essential oil to convert a substantial portion thereof to wood sugars, including the steps of:
    a. introducing the oil into an electrolyte solution;
    b. immersing a metal anode and a cathode spaced therefrom into the solution; and
    c. passing an electrical current through the solution until a substantial portion of the oil is converted to wood sugars.

2. The process defined in claim 1 wherein the electrolyte is a solution of NaCl.

3. The process defined in claim 2, wherein the solution concentration is approximately 2.0%.

4. The process defined in claim 1, wherein the electrolyte is formed with a salt having a pH of approximately 6 and wherein the completion of the reaaction produces a pH approaching 8.

5. The process defined in claim 1 wherein the metal anode is iron.

6. The process defined in claim 1 wherein the electrolyte solution is a blend of salts selected from the group including NaCl, NaHCO$_3$, Na$_3$C$_6$H$_5$O$_7$. 2H$_2$O; Na H$_2$PO$_4$ H$_2$O; K Cl and Ca Cl$_2$.

7. The method defined in claim 1, including the further step of inoculating the converted oil with bacteria.

8. The method for the treatment of wood particles containing essential oils to convert the oils to wood sugars and to change the structure of the wood to render the same susceptible to bacterial action including the steps of:
    a. immersing the wood particles into an electrolyte solution having a pH of approximately 6;
    b. immersing a metal anode and a cathode spaced therefrom into the solution; and
    c. passing an electrical current through the solution until the reaction is essentially complete as indicated, the pH approaching 8 and an increase in the volume of the wood particles.

9. The process defined in claim 8 wherein the electrolyte of the solution is NaCl.

10. The process defined in claim 9 wherein the solution concentrate is approximately 2.0% or less.

11. The process defined in claim 8 including the further step of inoculating the reacted blend of wood particles and solution with bacteria.

12. The process defined in claim 11 wherein the bacteria is Rumen flora.

13. The process defined in claim 11, wherein the bacteria is Termite flora.

14. The process defined in claim 8 wherein the electrolyte of the solution is a blend selected from salts including NaCl, NaHCO$_3$, C$_6$H$_5$O$_7$. 2H$_2$O; NaPO$_4$. H$_2$O, K Cl and Ca Cl$_2$.

15. The process defined in claim 8 wherein the electrode is iron.

16. The process defined in claim 8 wherein the electrode is copper.

17. The process defined in claim 8 wherein the weight of wood to solution is approximately 1 percent.

* * * * *